(12) United States Patent
Zeine et al.

(10) Patent No.: US 10,574,081 B2
(45) Date of Patent: *Feb. 25, 2020

(54) CALCULATING POWER CONSUMPTION IN WIRELESS POWER DELIVERY SYSTEMS

(71) Applicant: Ossia Inc., Bellevue, WA (US)

(72) Inventors: Hatem Zeine, Bellevue, WA (US); Anas Alfarra, Bellevue, WA (US); Dale Mayes, Bothell, WA (US); Fady El-Rukby, Redmond, WA (US); Samy Mahmoud, Kenmore, WA (US); John B. Springer, Tucson, AZ (US); Benjamin Todd Renneberg, Lake Tapps, WA (US); Prithvi Shylendra, Seattle, WA (US); Anthony L. Johnson, Edmonds, WA (US); Douglas Wayne Williams, Bellevue, WA (US)

(73) Assignee: Ossia Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,080

(22) Filed: Mar. 16, 2017

(65) Prior Publication Data

US 2017/0187231 A1 Jun. 29, 2017

Related U.S. Application Data

(63) Continuation of application No. 15/094,952, filed on Apr. 8, 2016, now Pat. No. 9,632,554.

(Continued)

(51) Int. Cl.
*H02J 7/00* (2006.01)
*H02J 7/02* (2016.01)
(Continued)

(52) U.S. Cl.
CPC .............. *H02J 7/025* (2013.01); *G06F 1/266* (2013.01); *G06F 1/28* (2013.01); *H02J 50/80* (2016.02);
(Continued)

(58) Field of Classification Search
CPC ..................................................... Y02E 60/12
(Continued)

(56) References Cited

U.S. PATENT DOCUMENTS

| | | |
|---|---|---|
| 3,989,994 A | 11/1976 | Brown |
| 4,257,050 A | 3/1981 | Ploussios |

(Continued)

FOREIGN PATENT DOCUMENTS

| | | |
|---|---|---|
| CN | 2666013 Y | 12/2004 |
| CN | 101645619 A | 2/2010 |

(Continued)

OTHER PUBLICATIONS

Colouro, Eric, "Wireless Charging? Nokia's Newest Prototype Phone Has It," Erictric, http://erictric.com/2009/06/17/wireless-charging-nokias-newest-prototype-phone-has-it/, 6 pages, Jun. 17, 2009.

(Continued)

*Primary Examiner* — Yalkew Fantu

(57) ABSTRACT

Various techniques are described herein for calculating power consumption in wireless delivery systems. In one example, power consumption is calculated by receiving information associated with at least one portable device, identifying a discharge/charge curve associated with at least one battery in the at least one portable device, and calculating power consumption of the least one portable device based at least in part on the received information and the identified discharge/charge curve.

20 Claims, 10 Drawing Sheets

Related U.S. Application Data

(60) Provisional application No. 62/256,694, filed on Nov. 17, 2015, provisional application No. 62/163,964, filed on May 19, 2015, provisional application No. 62/146,233, filed on Apr. 10, 2015.

(51) Int. Cl.
   *G06F 1/28* (2006.01)
   *G06F 1/26* (2006.01)
   *H04W 52/02* (2009.01)
   *H02J 50/80* (2016.01)
   *H04W 24/08* (2009.01)

(52) U.S. Cl.
   CPC ....... *H04W 24/08* (2013.01); *H04W 52/0229* (2013.01); *H04W 52/0251* (2013.01)

(58) Field of Classification Search
   USPC ........................................................ 320/106
   See application file for complete search history.

(56) References Cited

U.S. PATENT DOCUMENTS

| | | |
|---|---|---|
| 4,361,892 A | 11/1982 | Martin |
| 4,685,047 A | 8/1987 | Phillips, Sr. |
| 4,779,097 A | 10/1988 | Morchin |
| 5,000,037 A | 3/1991 | Baresh |
| 5,218,374 A | 6/1993 | Koert et al. |
| 5,223,781 A | 6/1993 | Criswell et al. |
| 5,400,037 A | 3/1995 | East |
| 5,486,833 A | 1/1996 | Barrett |
| 5,503,350 A | 4/1996 | Foote |
| 5,733,313 A | 3/1998 | Barreras, Sr. et al. |
| 6,114,834 A | 9/2000 | Parise |
| 6,127,799 A | 10/2000 | Krishnan |
| 6,474,341 B1 | 11/2002 | Hunter et al. |
| 6,615,074 B2 | 9/2003 | Mickle et al. |
| 6,621,470 B1 | 9/2003 | Boeringer et al. |
| 6,690,324 B2 | 2/2004 | Vail et al. |
| 6,700,538 B1 | 3/2004 | Richards |
| 6,721,159 B2 | 4/2004 | Takashige et al. |
| 6,738,017 B2 | 5/2004 | Jacomb-Hood |
| 6,856,291 B2 | 2/2005 | Mickle et al. |
| 6,882,128 B1 | 4/2005 | Rahmel et al. |
| 6,967,462 B1 | 11/2005 | Landis |
| 7,068,991 B2 | 6/2006 | Parise |
| 7,084,605 B2 | 8/2006 | Mickle et al. |
| 7,744,032 B2 | 6/2010 | Quinn et al. |
| 8,159,364 B2 | 4/2012 | Zeine |
| 8,410,953 B2 | 4/2013 | Zeine |
| 8,446,248 B2 | 5/2013 | Zeine |
| 8,558,661 B2 | 10/2013 | Zeine |
| 8,854,176 B2 | 10/2014 | Zeine |
| 9,142,973 B2 | 9/2015 | Zeine |
| 2002/0057219 A1 | 5/2002 | Obayashi |
| 2004/0140929 A1 | 7/2004 | Toda et al. |
| 2006/0224489 A1 | 10/2006 | Pantelis et al. |
| 2007/0142061 A1 | 6/2007 | Taubenheim et al. |
| 2008/0014897 A1 | 1/2008 | Cook et al. |
| 2008/0028239 A1* | 1/2008 | Rapps .................. G06F 1/263 713/300 |
| 2008/0042847 A1 | 2/2008 | Hollister et al. |
| 2008/0122297 A1 | 5/2008 | Arai |
| 2008/0217551 A1* | 9/2008 | Zhang .................. G01T 7/00 250/390.03 |
| 2008/0227478 A1 | 9/2008 | Greene et al. |
| 2008/0311961 A1* | 12/2008 | Cotevino .............. H04W 4/16 455/574 |
| 2009/0284220 A1 | 11/2009 | Toncich et al. |
| 2010/0033021 A1 | 2/2010 | Bennett |
| 2010/0133920 A1 | 6/2010 | Joannopoulos et al. |
| 2010/0142509 A1 | 6/2010 | Zhu et al. |
| 2010/0222010 A1 | 9/2010 | Ozaki et al. |
| 2010/0315045 A1 | 12/2010 | Zeine |
| 2011/0156640 A1 | 6/2011 | Moshfeghi |
| 2011/0225073 A1* | 9/2011 | Won ..................... G06Q 30/06 705/30 |
| 2012/0176227 A1 | 7/2012 | Nikitin |
| 2012/0220350 A1 | 8/2012 | Wu et al. |
| 2013/0201316 A1* | 8/2013 | Binder .................. H04L 67/12 348/77 |
| 2014/0004912 A1 | 1/2014 | Rajakarunanayake |
| 2014/0009108 A1 | 1/2014 | Leabman |
| 2014/0171107 A1 | 6/2014 | Kao et al. |
| 2014/0266034 A1 | 9/2014 | Lee et al. |
| 2014/0368053 A1* | 12/2014 | Lee ....................... H01F 38/14 307/104 |
| 2015/0038079 A1 | 2/2015 | Kwon et al. |
| 2015/0042526 A1 | 2/2015 | Zeine |
| 2016/0013666 A1 | 1/2016 | Uchida |
| 2016/0013685 A1 | 1/2016 | Zeine |
| 2016/0033254 A1 | 2/2016 | Zeine et al. |

FOREIGN PATENT DOCUMENTS

| | | |
|---|---|---|
| CN | 102347640 A | 2/2012 |
| CN | 104094530 A | 10/2014 |
| CN | 104360270 A | 2/2015 |
| EP | 2160814 A2 | 3/2010 |
| EP | 2560266 A1 | 2/2013 |
| EP | 2609670 A1 | 7/2013 |
| JP | 07236204 A | 9/1995 |
| JP | 08037743 A | 2/1996 |
| JP | 08103039 A | 4/1996 |
| JP | 08130840 A | 5/1996 |
| JP | 2002084685 A | 3/2002 |
| JP | 2002152995 A | 5/2002 |
| JP | 2004229427 A | 8/2004 |
| JP | 2005261187 A | 9/2005 |
| JP | 2007022382 A | 2/2007 |
| JP | 2013-026813 A | 2/2013 |
| JP | 2013-55879 A | 3/2013 |
| JP | 2015050719 A | 3/2015 |
| KR | 20050096068 A | 10/2005 |
| KR | 100654623 B1 | 11/2006 |
| KR | 20070055086 A | 5/2007 |
| KR | 20110088100 A | 8/2011 |
| KR | 2014-0121902 A | 10/2014 |
| KR | 2015-0032745 A | 3/2015 |
| WO | 200103438 A2 | 1/2001 |
| WO | 2008156571 A2 | 12/2008 |
| WO | 2012027166 A1 | 3/2012 |
| WO | 2014/132258 A1 | 9/2014 |
| WO | 2014/155519 A1 | 10/2014 |
| WO | 2015/022690 A1 | 2/2015 |
| WO | 2016019362 A1 | 2/2016 |

OTHER PUBLICATIONS

Goldoni, Emanuele et al., "Experimental Analysis of RSSI-Based Indoor Localization With IEEE 802.15.4," 2010 European Wireless Conference, pp. 71-77, Apr. 12-15, 2010.

International Application No. PCT/US2016/026819, International Search Report & Written Opinion, 11 pages, dated Jul. 25, 2016.

International Application No. PCT/US2016/026824, International Search Report & Written Opinion, 14 pages, dated Jul. 22, 2016.

Murali, K., "Smart Antennas for Wireless Mobile Communication," Antenna Systems & Technology Executive E-Report, Webcom Communications Corp., 12 pages, Oct. 2004.

Ohinese Patent Application No. 2016800333967, Office Action, 22 pages, dated Jan. 22, 2019.

Korean Patent Application No. 2017-7032538, Office Action, 7 pages, dated Mar. 19, 2019.

Japanese Patent Application No. 2017-552049, Office Action, 4 pages, dated Jul. 9, 2019.

Japanese Patent Application No. 2017-552049, Office Action, 12 pages, dated Nov. 13, 2018.

(56) References Cited

OTHER PUBLICATIONS

European Patent Application No. 16836076.6, Extended European Search Report, 8 pages, Oct. 29, 2019.

* cited by examiner

CALCULATING POWER CONSUMPTION IN WIRELESS POWER DELIVERY SYSTEMS

CROSS-REFERENCE TO RELATED APPLICATIONS

This application is a continuation of U.S. patent application Ser. No. 15/094,952, filed Apr. 8, 2016, titled "CALCULATING POWER CONSUMPTION IN WIRELESS POWER DELIVERY SYSTEMS"; which claims priority to U.S. Provisional Application No. 62/256,694, filed Nov. 17, 2015, titled "INTEGRATED CHIPS INCORPORATING TRANSCEIVER COMPONENTS FOR REMOTE WIRELESS POWER DELIVERY AND FOR RECEIVING WIRELESS POWER," and U.S. Provisional Application No. 62/163,964, filed May 19, 2015, titled "SYSTEMS AND METHODS FOR WIRELESS CHARGING," and U.S. Provisional Application No. 62/146,233, filed Apr. 10, 2015, titled "SYSTEMS AND METHODS FOR WIRELESS CHARGING," all of which are hereby incorporated by reference in their entireties.

This application is related to U.S. patent application Ser. No. 15/094,963, filed Apr. 8, 2016, titled "WIRELESS CHARGING WITH MULTIPLE POWER RECEIVING FACILITIES ON A WIRELESS DEVICE"; U.S. patent application Ser. No. 15/093,868, filed Apr. 8, 2016, titled "INFERRING BATTERY STATUS OF AN ELECTRONIC DEVICE IN A WIRELESS POWER DELIVERY ENVIRONMENT"; U.S. patent application Ser. No. 15/094,079, filed Apr. 8, 2016, titled "WIRELESS POWER TRANSCEIVERS FOR SUPPLEMENTING WIRELESS POWER DELIVERY AND EXTENDING RANGE"; U.S. patent application Ser. No. 15/093,023, filed Apr. 7, 2016, titled "TECHNIQUES FOR STATICALLY TUNING RETRODIRECTIVE WIRELESS POWER TRANSMISSION SYSTEMS"; U.S. patent application Ser. No. 15/092,026, filed Apr. 6, 2016, titled "ESTABLISHING CONNECTIONS WITH CHARGERS IN MULTI-CHARGER WIRELESS POWER DELIVERY ENVIRONMENTS"; U.S. patent application Ser. No. 15/091,986, filed Apr. 6, 2016, titled "TECHNIQUES FOR DELIVERING RETRODIRECTIVE WIRELESS POWER"; U.S. patent application Ser. No. 15/048,982, filed Feb. 19, 2016, titled "WIRELESSLY CHARGEABLE BATTERY APPARATUS"; U.S. patent application Ser. No. 15/048,984, filed Feb. 19, 2016, titled "REMOVABLY ATTACHABLE PORTABLE DEVICE APPARATUS WITH INTEGRATED WIRELESS POWER RECEIVING FACILITIES"; U.S. patent application Ser. No. 14/956,673, filed Dec. 2, 2015, titled "TECHNIQUES FOR ENCODING BEACON SIGNALS IN WIRELESS POWER DELIVERY ENVIRONMENTS"; U.S. patent application Ser. No. 14/945,741, filed Nov. 19, 2015, titled "TECHNIQUES FOR IMAGING WIRELESS POWER DELIVERY ENVIRONMENTS AND TRACKING OBJECTS THEREIN"; U.S. patent application Ser. No. 14/945,783, filed Nov. 19, 2015, titled "WIRELESSLY POWERED ELECTRONIC DISPLAY APPARATUSES"; U.S. patent application Ser. No. 14/926,014, filed Oct. 29, 2015, titled "TECHNIQUES FOR FILTERING MULTI-COMPONENT SIGNALS"; all of which are hereby incorporated by reference in their entireties.

TECHNICAL FIELD

The technology described herein relates generally to the field of wireless communication and power transmission, such as wireless power delivery systems and clients for receiving wireless power.

BACKGROUND

Many portable electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It would, therefore, be desirable to derive power for a battery charger from electromagnetic radiation.

Accordingly, a need exists for technology that overcomes the problem demonstrated above, as well as one that provides additional benefits. The examples provided herein are of some prior or related systems and their associated limitations are intended to be illustrative and not exclusive. Other limitations of existing or prior systems will become apparent to those of skill in the art upon reading the following Detailed Description.

Overall, the examples herein of some prior or related systems and their associated limitations are intended to be illustrative and not exclusive. Other limitations of existing or prior systems will become apparent to those of skill in the art upon reading the following.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
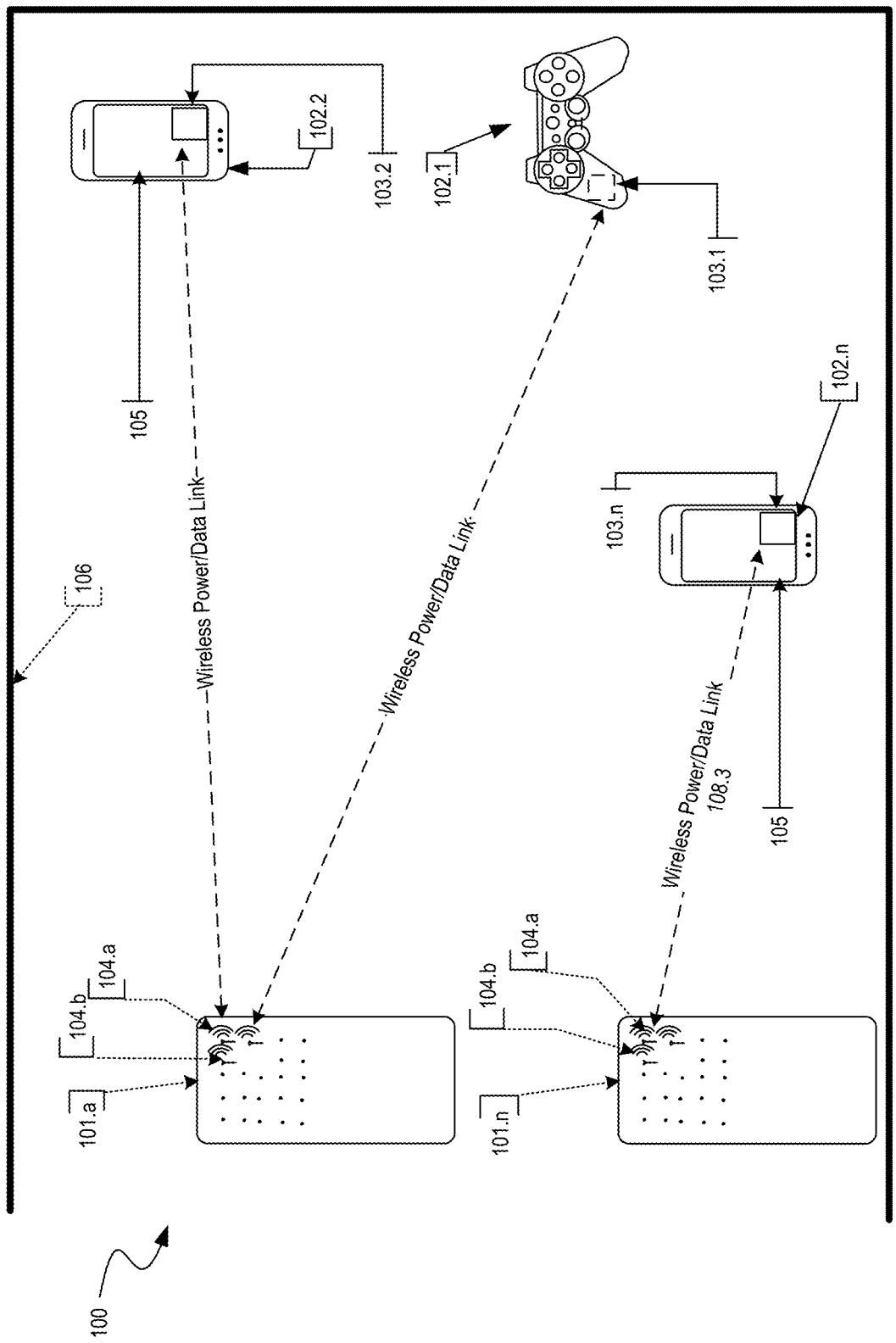
FIG. 1 is a diagram illustrating an example wireless power delivery environment depicting wireless power delivery from one or more wireless transmitters to various wireless devices within the wireless power delivery environment.

The following description and drawings are illustrative and are not to be construed as limiting. Numerous specific details are described to provide a thorough understanding of the disclosure. However, in certain instances, well-known or conventional details are not described in order to avoid obscuring the description. References to "one" or "an" embodiment in the present disclosure can be, but not necessarily are, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, and no special significance is meant when a term is elaborated upon herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of the reader, and in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure describe various techniques for wirelessly charging and/or wireless power delivery from one or more chargers to one or more wireless devices (also referred to herein as "devices" or "target devices") having embedded, attached, and/or integrated power receiver clients (also referred to herein as "wireless power receivers" or "clients").

The techniques described herein utilize wireless technologies to deliver power, data or both. In some embodiments, power, data, or both, may be delivered simultaneously as a continuous complex waveform, as a pulsed waveform, as multiple overlapping waveforms, or combinations or variations thereof. The power and data may be delivered using the same or different wireless technologies.

The wireless technologies described herein may apply to not only electromagnetic (EM) waves, but also to sound waves, and/or other forms of periodic excitations (e.g., phonons). EM waves may include radio waves, microwaves, infrared radiation, visible light, ultraviolet radiation, X-rays, and/or gamma rays. Sound waves may include infrasound waves, acoustic waves, and/or ultrasound waves. The techniques described herein may simultaneously utilize multiple wireless technologies and/or multiple frequency spectrums within a wireless technology to deliver the power, data or both.

The wireless technologies may include dedicated hardware components to deliver power and/or data. The dedicated hardware components may be modified based on the wireless technology, or combination of wireless technologies, being utilized. For example, when applied to sound waves, the system employs microphones and speakers rather than antennas.

System Overview/Architecture

FIG. 1 is a diagram illustrating an example wireless communication/power delivery environment 100 depicting wireless power delivery from one or more wireless transmitters 101 to various wireless devices 102 within the wireless communication/power delivery environment. More specifically, FIG. 1 illustrates an example wireless power delivery environment 100 in which wireless power and/or data can be delivered to available wireless devices 102.1-102.$n$ having one or more power receiver clients 103.1-103.$n$ (also referred to herein as "wireless power receivers" or "wireless power clients"). The wireless power receivers are configured to receive wireless power from one or more wireless transmitters 101.

As shown in the example of FIG. 1, the wireless devices 102.1-102.$n$ are mobile phone devices 102.2 and 102.$n$, respectively, and a wireless game controller 102.1, although the wireless devices 102.1-102.$n$ can be any (smart or dumb) wireless device or system that needs power and is capable of receiving wireless power via one or more integrated power receiver clients 103.1-103.$n$. Smart devices are electronic devices that can communicate (e.g., using WiFi) and transmit beacon signals. Dumb devices are electronic device are passive devices that may not communication (e.g., no Bluetooth or WiFi capability) and may not transmit a beacon signal. As discussed herein, the one or more integrated power receiver clients or "wireless power receivers" receive and process power from one or more transmitters/transmitters 101.$a$-101.$n$ and provide the power to the wireless devices 102.1-102.$n$ for operation thereof.

Each transmitter 101 (also referred to herein as a "charger", "array of antennas" or "antenna array system") can include multiple antennas 104, e.g., an antenna array including hundreds or thousands of spaced-apart antennas, that are each capable of delivering wireless power to wireless devices 102. Each transmitter 101 may also deliver wireless communication signals to wireless devices 102. In some embodiments, the wireless power and wireless communication signals may be delivered as a combined power/communication signal. Indeed, while the detailed description provided herein focuses on wirelessly transmitting power, aspects of the invention are equally applicable to wirelessly transmitting data.

In some embodiments, the antennas are adaptively-phased radio frequency antennas and the transmitter 101 utilizes a novel phase shifting algorithm as described in one or more of U.S. Pat. Nos. 8,558,661, 8,159,364, 8,410,953, 8,446, 248, 8,854,176, U.S. patent application Ser. Nos. 14/461,332 and 14/815,893. The transmitter 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other.

Additionally, the transmitter 101 may include a time delayed retro directive radio frequency (RF) holographic array that delivers wireless RF power that matches the client antenna patterns in three-dimensional (3D) space (polarization, shape & power levels of each lobe). It is appreciated that use of the term "array" does not necessarily limit the antenna array to any specific array structure. That is, the antenna array does not need to be structured in a specific "array" form or geometry. Furthermore, as used herein he term "array" or "array system" may be used include related and peripheral circuitry for signal generation, reception and transmission, such as radios, digital logic and modems.

The wireless devices 102 can include one or more power receiver clients 103 (also known as a "wireless power receiver"). As illustrated in the example of FIG. 1, power delivery antennas 104a and data communication antennas 104b are shown. The power delivery antennas 104a are configured to provide delivery of wireless radio frequency power in the wireless power delivery environment. The data communication antennas are configured to send data communications to, and receive data communications from, the power receiver clients 103.1-103 and/or the wireless devices 102.1-102.$n$. In some embodiments, the data communication antennas can communicate via Bluetooth™, WiFi, ZigBee™, or other wireless communication protocols.

Each power receiver client 103.1-103.$n$ includes one or more antennas (not shown) for receiving signals from the transmitters 101. Likewise, each transmitter 101.$a$-101.$n$ includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.$n$. For example, coherent signals can be determined by computing the complex conjugate of a received beacon signal at each antenna of the array such that the coherent signal is properly phased for the particular power receiver client that transmitted the beacon signal. The beacon signal, which is primarily referred to herein as a continuous waveform, can alternatively or additionally take the form of a modulated signal.

Although not illustrated, each component of the environment, e.g., wireless power receiver, transmitter, etc., can include control and synchronization mechanisms, such as a data communication synchronization module. The transmitters 101.$a$-101.$n$ are connected to a power source such as, for example, a power outlet or source connecting the transmitters to a standard or primary alternating current (AC) power supply in a building. Alternatively or additionally, one or more of the transmitters 101.$a$-101.$n$ can be powered by a battery or via other power providing mechanism.

In some embodiments, the power receiver clients 102.1-102.$n$ and/or the transmitters 101.$a$-101.$n$ utilize or encounter reflective objects 106 such as, for example, walls or other RF reflective obstructions within range to beacon and deliver and/or receive wireless power and/or data within the wireless power delivery environment. The reflective objects 106 can be utilized for multi-directional signal communication regardless of whether a blocking object is in the line of sight between the transmitter and the power receiver client.

As described herein, each wireless device 102.1-102.$n$ can be any system and/or device, and/or any combination of devices/systems that can establish a connection with another device, a server and/or other systems within the example environment 100. In some embodiments, the wireless devices 102.1-102.$n$ include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a battery or component coupled to a battery, a PDA etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door locks/handles, electric light switch controllers, electric shavers, etc.

Although not illustrated in the example of FIG. 1, the transmitter 101 and the power receiver clients 103.1-103.$n$ can each include a data communication module for communication via a data channel. Alternatively or additionally, the power receiver clients 103.1-103.$n$ can direct the wireless devices 102.1-102.$n$ to communicate with the transmitter via existing data communications modules.

Figure 2:
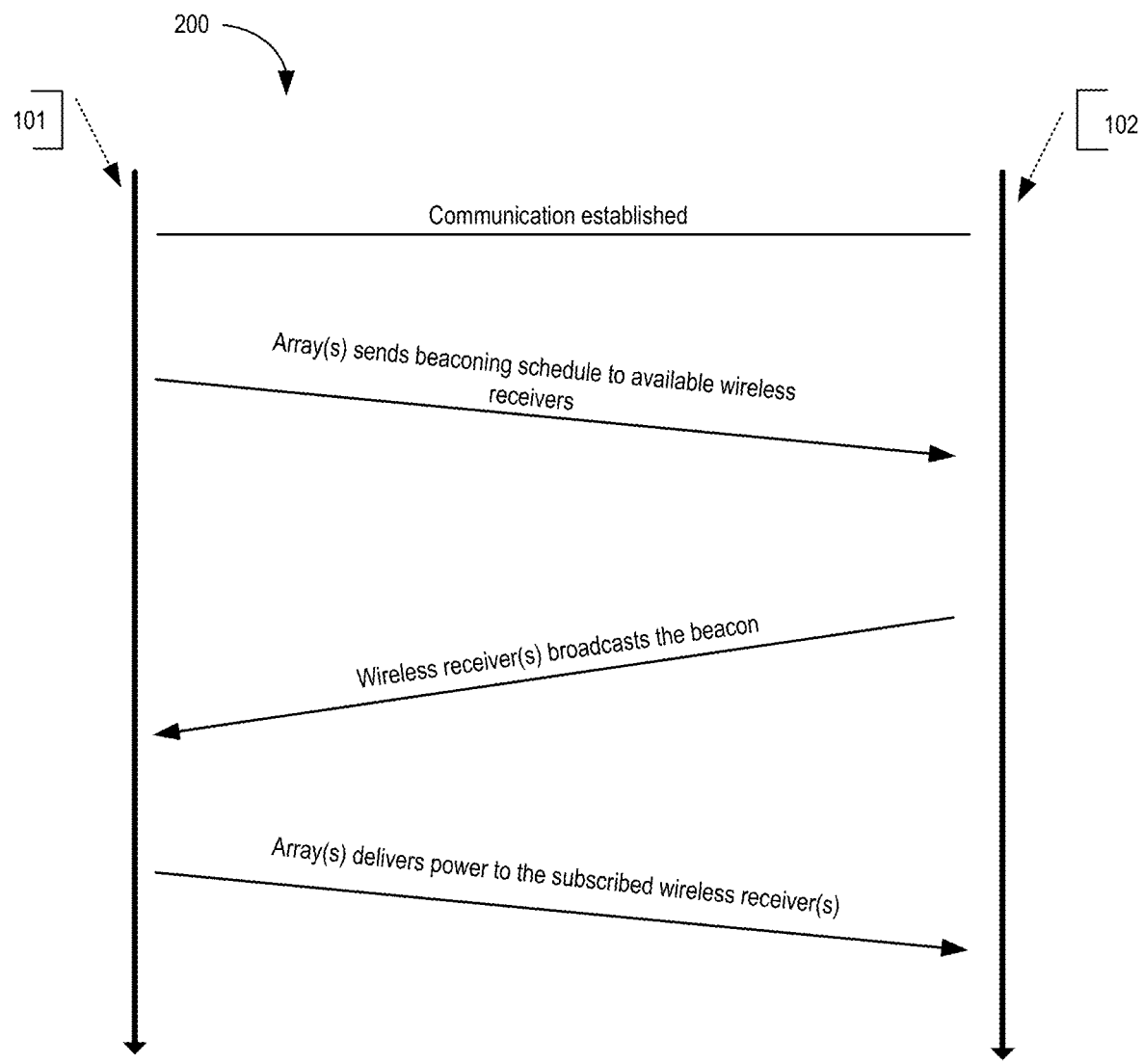
FIG. 2 is a sequence diagram illustrating example operations between a wireless transmitter and a power receiver client for commencing wireless power delivery.

FIG. 2 is a sequence diagram 200 illustrating example operations between a wireless transmitter 101 and a power receiver client 103 for commencing wireless power delivery, according to an embodiment. Initially, communication is established between the transmitter 101 and the power receiver client 103, such as communicate via Bluetooth™, WiFi, ZigBee™, or other wireless communication protocols. The transmitter 101 subsequently sends a beaconing schedule to the power receiver client 103 to arrange beacon broadcasting and RF power/data delivery schedules with this and any other power receiver clients. Based on the schedule, the power receiver client 103 broadcasts the beacon. As shown, the transmitter 101 receives the beacon from the power receiver client 103 and detects the phase (or direction) at which the beacon signal was received. The transmitter 101 then delivers wireless power and/or data to the power receiver client 103 based the phase (or direction) of the received beacon. That is, the transmitter 101 determines the complex conjugate of the phase and uses the complex conjugate to deliver power to the power receiver client 103 in the same direction in which the beacon signal was received from the power receiver client 103.

In some embodiments, the transmitter 101 includes many antennas; one or more of which are used to deliver power to the power receiver client 103. The transmitter 101 can detect phases of the beacon signals that are received at each antenna. The large number of antennas may result in different beacon signals being received at each antenna of the transmitter 101. The transmitter may then utilize the algorithm or process described in one or more of U.S. Pat. Nos. 8,558,661, 8,159,364, 8,410,953, 8,446,248, 8,854,176, and U.S. Provisional Patent Application Nos. 62/146,233 and 62/163,964. The algorithm or process determines how to emit signals from one or more antennas that takes into account the effects of the large number of antennas in the transmitter 101. In other words, the algorithm determines how to emit signals from one or more antennas in such a way as to create an aggregate signal from the transmitter 101 that approximately recreates the waveform of the beacon, but in the opposite direction.

Figure 3:
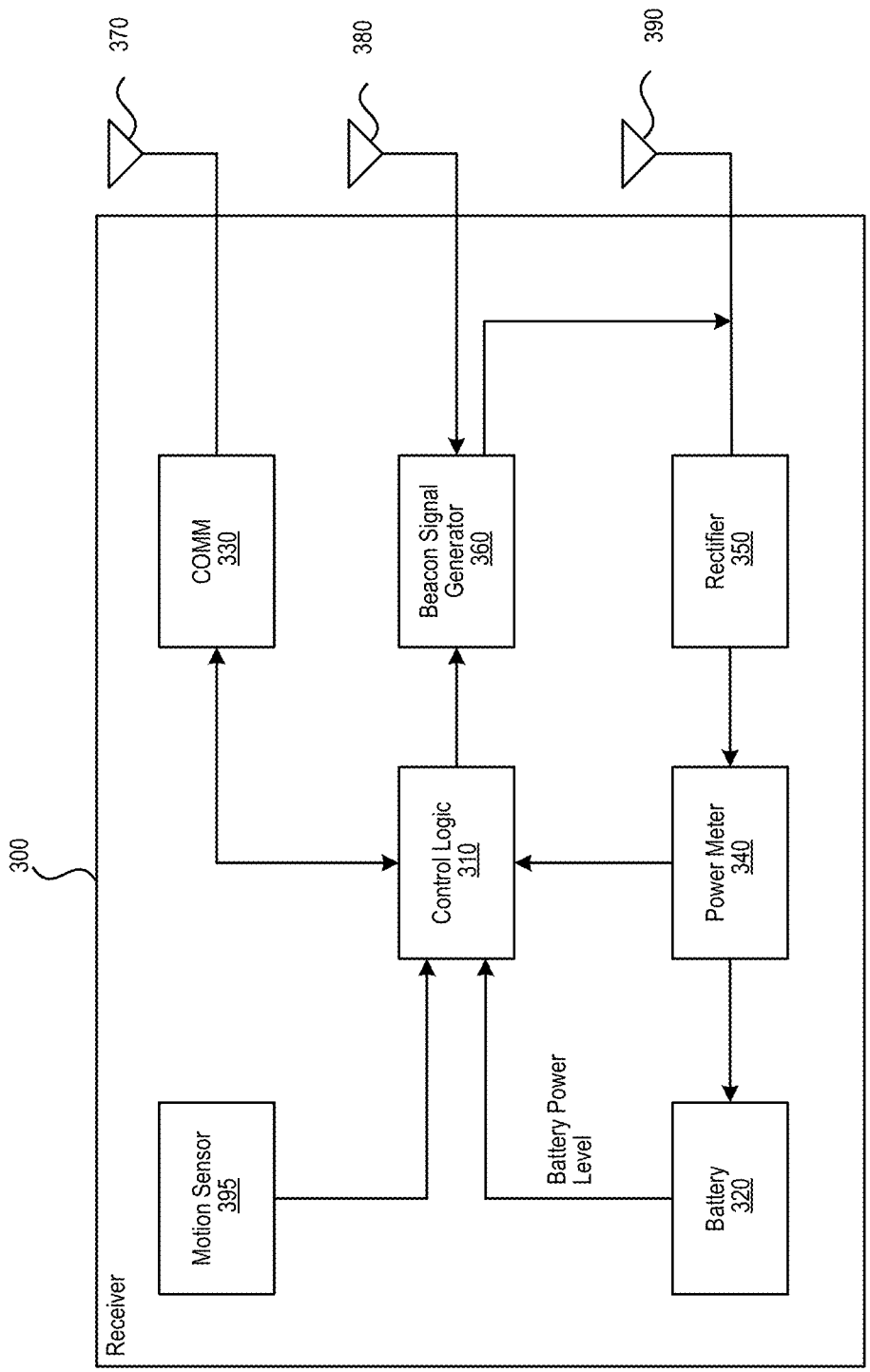
FIG. 3 is a block diagram illustrating an example wireless power receiver (client) in accordance with an embodiment.

FIG. 3 is a block diagram illustrating an example receiver 300 in accordance with an embodiment. The receiver 300 includes various components including control logic 310, battery 320, communication block 330 and associated antenna 370, power meter 340, rectifier 350, beacon signal generator 360 and an associated antenna 380, and switch 365 connecting the rectifier 350 or the beacon signal generator 360 to an associated antenna 390. Some or all of the components can be omitted in some embodiments. Additional or fewer components are also possible.

The rectifier 350 receives (via one or more client antennas) the power transmission signal from the power transmitter, which is fed through the power meter 340 to the battery 320 for charging. The power meter 340 measures the total received power signal strength and provides the control logic 310 with this measurement. The control logic 310 also may receive the battery power level from the battery 320 itself or receive battery power data from, e.g. an API of an operating system running on the receiver 300. The control logic 310 may also transmit/receive via the communication block 330 a data signal on a data carrier frequency, such as the base signal clock for clock synchronization. The beacon signal generator 360 transmits the beacon signal, or calibration signal, using either the antenna 380 or 390. It may be noted that, although the battery 320 is shown for being charged and for providing power to the receiver 300, the receiver may also receive its power directly from the rectifier 350. This may be in addition to the rectifier 350 providing charging current to the battery 320, or in lieu of providing charging. Also, it may be noted that the use of multiple antennas is one example of implementation and the structure may be reduced to one shared antenna, where the receiver multiplexes signal reception/transmission.

An optional motion sensor 395 detects motion and signals the control logic 310. For example, when a device is receiving power at high frequencies above 500 MHz, its location may become a hotspot of (incoming) radiation. So when the device is on a person, the level of radiation may exceed a regulation or exceed acceptable radiation levels set by medical/industrial authorities. To avoid any over-radiation issue, the device may integrate motion detection mechanisms such as accelerometers, assisted GPS, or other mechanisms. Once the device detects that it is in motion, the disclosed system assumes that it is being handled by a user, and signals the power transmitting array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

Figure 4:
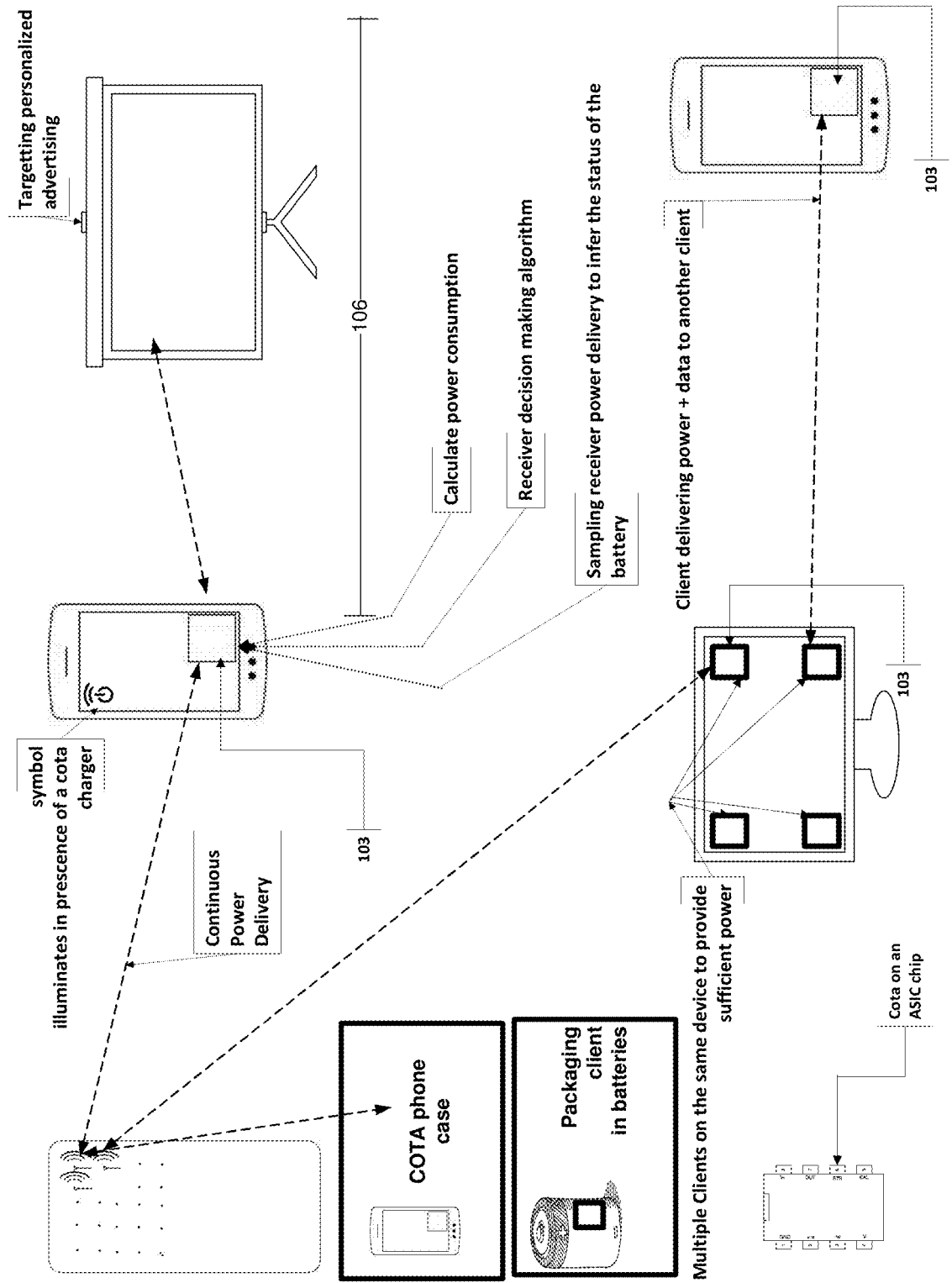
FIG. 4 is a system overview diagram illustrating various components of the various embodiments described herein.

FIG. 4 is a system overview diagram illustrating various embodiments and components possible, though other combinations and variations are possible. As shown, among other features, in some embodiments, the wireless power receiver can be in a form of an application specific integrated circuit (ASIC) chip, a mobile phone case, in a display device (e.g. computer monitor or television, which in turn may relay power to a nearby receiver 103), packaged within a standard battery form factor (e.g. AA battery), etc.

Techniques for Calculating Power Consumption in Wireless Power Delivery Systems

Techniques for calculating power consumption in wireless power delivery systems are disclosed herein. More specifically, techniques for calculating power consumption of devices, operating systems and applications are disclosed. For example, if multiple mobile phones having different operating systems are being charged via a wireless power delivery system, then the system can record power consumption of each individual mobile phone, the power consumption of each operating system running on each mobile phone, and the power consumption of each specific application running on each mobile phone. For example, a map application may consume more power if it is using GPS and a constant data connection to a website (versus an application that does not). Also, sometimes users may notice that their mobile phone runs out of charge more quickly than before but they would not know why. The techniques described herein may make it easier to pinpoint the cause, as well as provide other benefits.

Figure 5:
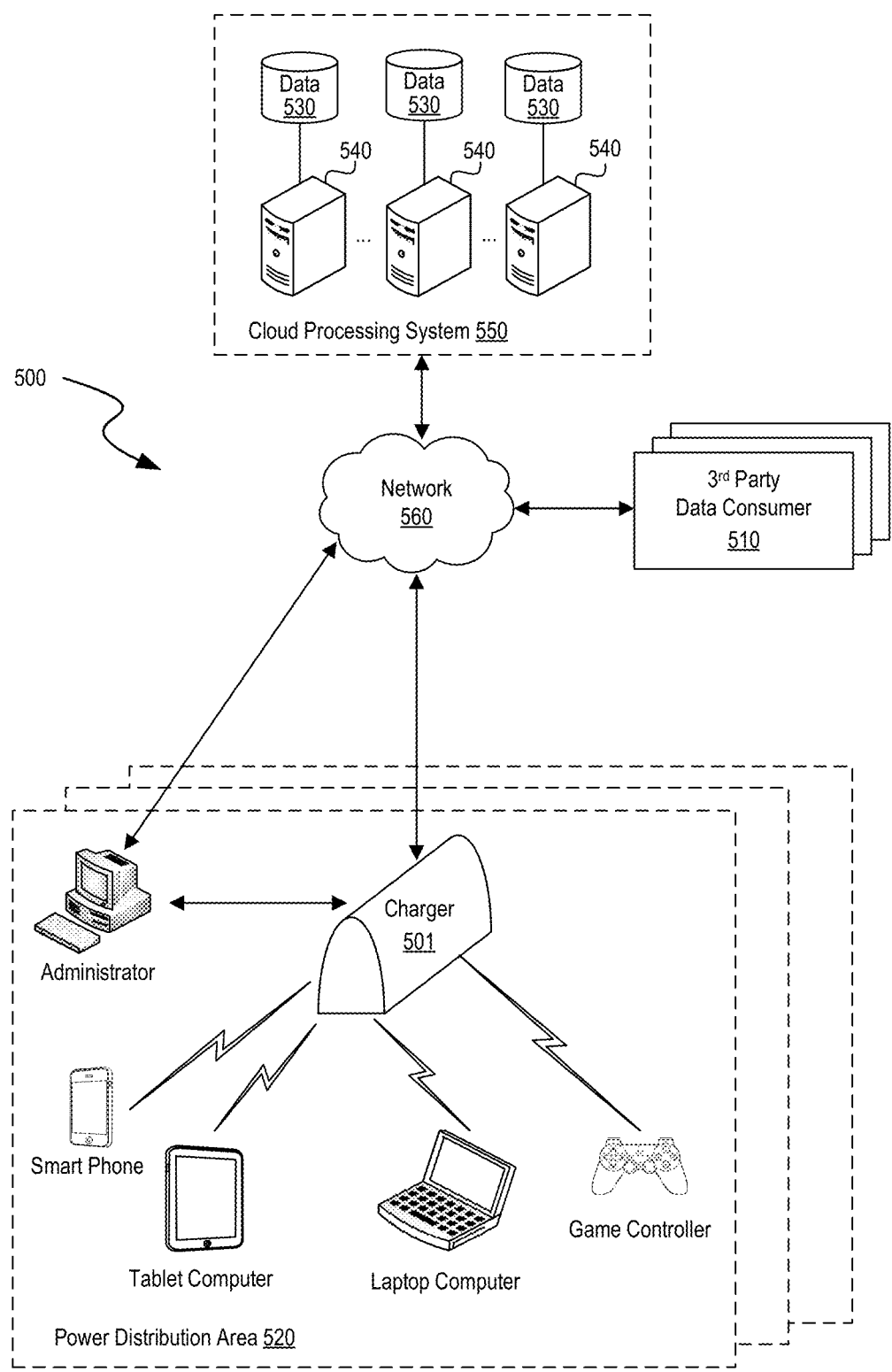
FIG. 5 is a diagram illustrating an example environment including a cloud processing system configured to calculate power consumption of wireless devices in power distribution areas, according to various embodiments.

FIG. 5 is a diagram illustrating an example environment 500 including a cloud processing system 550 configured to calculate power consumption of wireless devices in power distribution areas 520, according to various embodiments. As shown in the example of FIG. 5, the example environment 500 includes the cloud processing system 550, a network 560, multiple power distribution areas 520, and multiple third party data consumers 510. Each power distribution area 520 includes one or more wireless power transmitters or "chargers" 501 in communication with the network 560 and an administrator device (either locally or via network 560). The chargers 501 provide wireless power to various wireless devices as described herein.

As shown in FIG. 5, the cloud processing system 550 includes multiple servers 540 and data repositories 530. Any number of servers 540 and/or data repositories 530 may be included with cloud processing system 550. The cloud processing system 550 is configured to calculate power usage of wireless devices in each power distribution area 520.

More specifically, the wireless devices can provide information to the chargers 501 through the use of software on the wireless devices that access APIs on the devices to gather the information. For example, a charger 501 may transmit a periodic "Client Query" message to a client. This message requests the client to return a variety of information to the charger 501. In some examples, the Client Query message may be a ZigBee message. Alternatively, the wireless device may automatically transmit the information to the charger 501 periodically, or based on a trigger (e.g., when the battery level is below a threshold value, or when a rate of power consumption exceeds a threshold value). The information sent to the charger 501 may include a device manufacturer name or ID, device model, battery type/model, hardware, operating system, etc. The information may also include periodic updates on or status of applications currently running on the device, present battery status, device location, RF power received since last request, coulombs in or out of the battery since last request, device temperature, or other information related to power usage.

The charger 501 receives this information and passes it along via network 560 to the cloud processing system 550. Alternatively, in some embodiments, the charger 501 includes local processing capabilities. The cloud processing system 550 or charger 501 then calculates power usage of the wireless devices based on the received information, including power usage based on particular hardware, operating system, application usage, etc. For example, the cloud processing system 550 or charger 501 may utilize the wireless device's battery status (e.g., voltage and/or coulombs in/out) to calculate the power usage of the particular hardware. In some embodiments, the cloud processing system 550 or charger 501 includes a database of types of batteries used in wireless devices, and their associated discharge/charge curves. The cloud processing system 550 or charger 501 may identify a particular discharge/charge curve from the information received from the wireless device (e.g., device ID, manufacturer/model number, etc.). The cloud processing system 550 or charger 501 may then identify where on the discharge/charge curve the device's present battery status falls, and from that calculate the time to charge or the time to die for that particular battery. The cloud processing system 550 or charger 501 may also track the percentage of time spent sending power to each wireless device, and from that calculate the amount of power that should be delivered to each wireless device.

In some embodiments, the cloud processing system 550 provides various information and alerts to a user and/or to a charger 501. For example, if the power consumption of particular devices exceeds a threshold, this might trigger an alert. The cloud processing system 550 can also provide recommendations regarding power consumption to a user and/or charger 501, and/or the wireless device. For example, if the charger 501 scheduled a particular wireless device ("client 1") to receive 75% of the available charge cycles over the last minute, but client 1 reports that more power was discharged from its battery than delivered into the battery, the cloud processing system 550 could report to the user to "move client 1 closer to the charger." At the same time, charger 501 may dedicate more charging cycles to other wireless devices that may have a more effective power delivery.

The third-party data consumers 510 may be any entity that can utilize the collected wireless device information. For example, the third-party data consumers 510 can include telecommunications service providers, security service providers, home automation systems, energy companies, application developers (e.g., to optimize development across platforms, device manufacturers, etc.). In some embodiments, the third-party data consumers 510 can purchase and/or otherwise obtain rights to aggregated data from the cloud processing system 550. For example, a security service provider may utilize phase data included in the wireless device information to determine if there is motion in the power distribution area 520 (e.g., in lieu of access to motion sensor data). As another example, a home automation system may utilize temperature data included in the wireless device information to control a home thermostat.

The network 560 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The network 560 can be any collection of distinct networks operating wholly or partially in conjunction to provide connectivity to the cloud processing system 550, chargers 501 and third party data consumers 510. In some embodiments, communications to and from the cloud processing system 550, chargers 501 and third party data consumers 510 can be achieved by an open network, such as the Internet, or a private network, such as an intranet and/or the extranet.

The cloud processing system 550, chargers 501 and third party data consumers 510 can be coupled to the network 560 (e.g., Internet) via a dial-up connection, a digital subscriber loop (DSL, ADSL), cable modem, wireless connections, direct fiber connections and/or any other types of connection.

The databases 530 can be implemented via object-oriented technology and/or via text files, and can be managed by any database management system. As shown, the databases 530 are coupled to (or otherwise included within cloud processing system 550). However, it is appreciated that in some embodiments, the databases 530 may be alternatively or additionally directly coupled to network 560 and/or distributed across multiple systems.

In some embodiments, and as noted above, the wireless device has installed a simple client application on its operating system (iOS, Android, etc.). The wireless device initially reports the device hardware information, the operating system device information, and/or the battery status to the charger 501. For example, the wireless device may receive a ZigBee message requesting the information, and may then return the information to the charger 501. Alternatively, the wireless device may automatically provide the information to the charger 501 periodically or based on a trigger (e.g., when the battery level is below a threshold value, or when a rate of power consumption exceeds a threshold value). The wireless device may periodically update relevant information such as running applications, battery status, and location to the charger 501. The charger 501 reports this information collected from the client to an admin interface of the cloud processing system 550. An example of the admin interface of the cloud processing system 550 is shown in FIG. 6.

Figure 6:
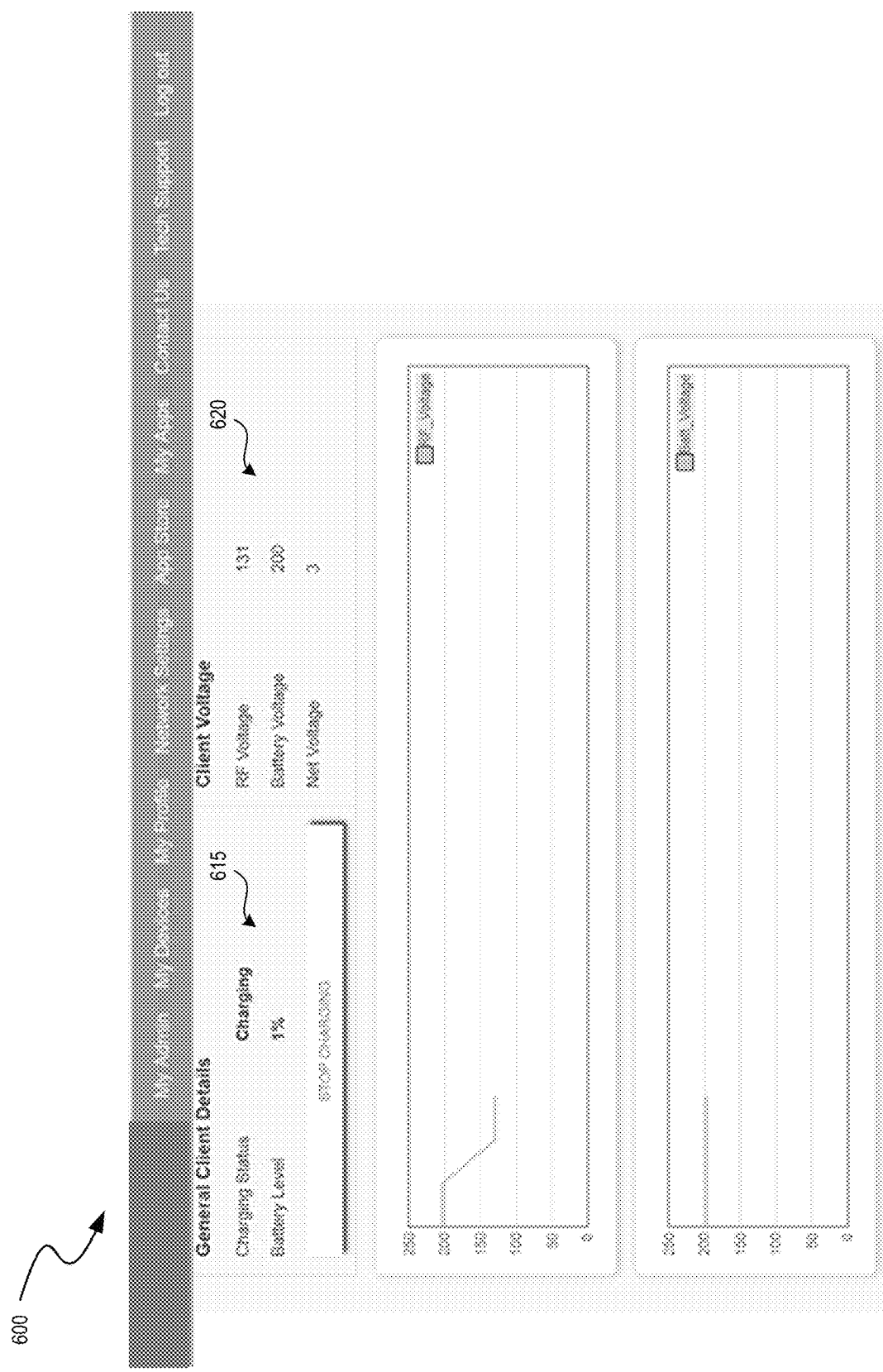
FIG. 6 is a diagram illustrating an example of an admin interface of a cloud processing system, according to various embodiments.

As shown in FIG. 6, the admin interface 600 includes general charging details 615 for a selected wireless device. The general charging details include the selected wireless devices charging status (e.g., not charging, charging, fully charged) and the battery level of the selected wireless device. The admin interface 600 further includes voltage information 620 for a selected wireless device. The voltage information 620 includes RF voltage, the present battery voltage, and the net voltage. The voltage information 620 may plotted over time to show changes in the wireless device's voltage.

Returning to FIG. 5, the cloud processing system 550 sends information and alerts if power level consumption exceeds a threshold or usual/average value. The cloud processing system 550 may send the alerts to the wireless device, to the charger 501, and/or as a notification in the admin interface. The alerts may be a visual notification on a display (e.g., a pop-up window), an audio notification (e.g., an alarm), or other type of notification. The cloud processing system 550 also can send recommendations regarding power usage based on previously collected information to the wireless device through the charger 501. The wireless device user or the administrator may monitor the calculated power usage based on hardware, operating system, running apps, or other characteristics of the wireless device. This information may also be beneficial to 3rd party data consumers, such as telecommunication companies, energy companies, and application developers. For example, an application developer may utilize the power usage information to optimize application development across hardware platforms and operating systems.

Thus, in some embodiments, the techniques described herein solve the problem of enabling a charger system to calculate the power consumption requirements for hardware, operating systems and applications consistently across devices that are based on different platforms.

In some embodiments, operating systems (such as iOS) may provide a breakdown of battery consumption per application. However, the techniques described herein are based on the operating system and client device itself, and not a centralized service, Thus, the techniques described herein provide the power usage information across different hardware, operating systems and applications.

As described above, the cloud processing system 550 or charger 501 may calculate the power usage information for devices, operating systems, and/or applications. In some embodiments, this power usage information is useful for owners of the charger 501 and for owners of the wireless devices so they are aware of the cost incurred and the battery life length for the wireless devices. This power usage information could also be useful for other providers and software developers as a way to optimize hardware and software energy consumption. Furthermore, on a larger scale, measuring power consumption and application usage at such a granular level and at such a global scale may be leveraged to uncover trends. For example, if power consumption increases across many wireless devices at one time, this could be an indication of a specific event many users are experiencing. For example, if the power consumption for a specific application (e.g., a weather application) increases for many wireless devices, this could mean that users are experiencing an issue with that application (e.g., a major weather issue).

In some embodiments, the same power usage information is useful for understanding usage habits of users which allows for customizing services and providing more targeted advertising. For example, if a user's battery performance starts degrading, it is possible to notify them that it is time to change the battery and to recommend a battery that meets his or her needs.

Figure 7A:
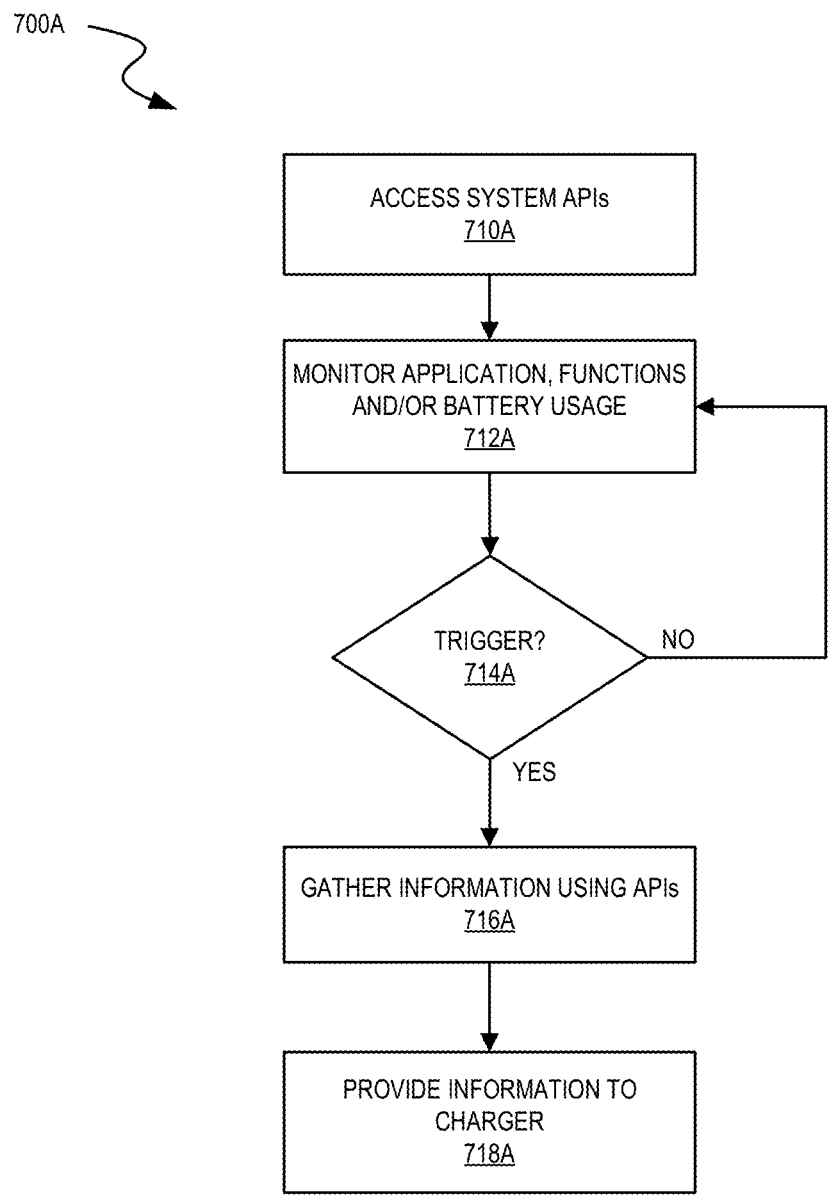
FIGS. 7A and 7B are flow diagrams illustrating example processes facilitating calculation of power consumption of wireless devices, according to various embodiments.
Figure 7B:
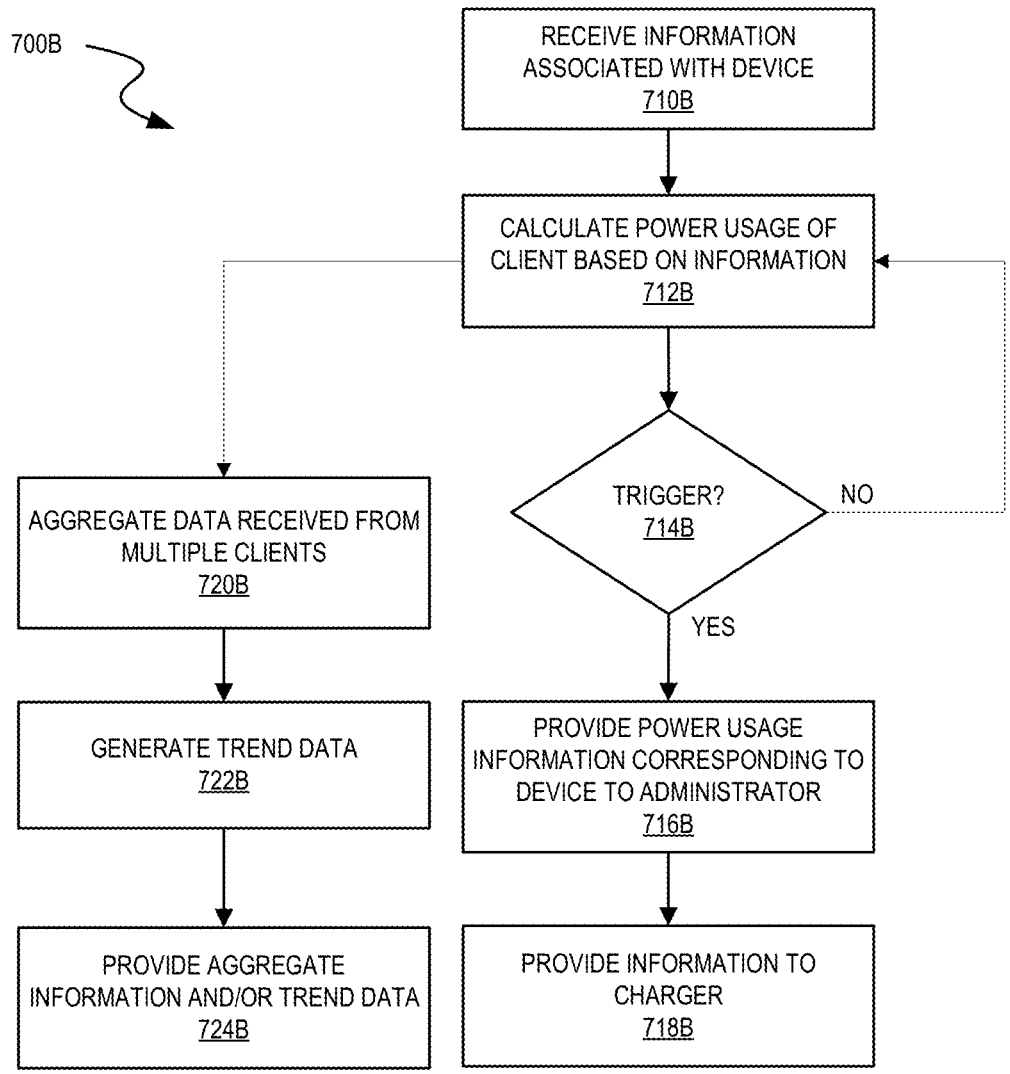

FIGS. 7A and 7B are flow diagrams illustrating example processes 700A and 700B, respectively, facilitating calculation of power consumption of wireless devices, according to various embodiments. An application and/or software module having instructions included therein can be executed by one or more processors of the wireless device to cause the wireless device, in conjunction with a power receiver client such as, for example, client 103 of FIG. 1, to perform the example process 700A. The wireless device can be any wireless device such as, for example, wireless device 102 of FIG. 1. An application and/or software module having instructions included therein can be executed by one or more processors of a cloud processing system such as, for example, cloud processing system 550 of FIG. 5, directing the cloud processing system to perform the example process 700B.

Referring to FIG. 7A, process 700A illustrates a flow diagram showing an example process 700A facilitating calculation of power consumption of a wireless device in a wireless power delivery environment, according to an embodiment. To begin, at process 710A, the wireless device accesses one or more Application Program Interfaces (APIs) on the wireless device to gather information related to the wireless device. For example, the information can include a device manufacturer name or ID, device model, battery type/model, hardware, operating system, attached devices (e.g., wirelessly connected keyboard/mouse), etc. The information can also include periodic updates on applications currently running or executing on the wireless device, current battery level of the primary battery of the wireless device, the wireless device's current/past locations, etc.

At process 712A, the wireless device monitors the applications executing on the wireless device (e.g., those applications that are running or have a footprint in RAM). At a decision process 714A, the wireless device determines if a trigger is detected. In some embodiments, the trigger can be configured to occur periodically. Alternatively or additionally, the trigger can occur if, for example, a threshold level of power is crossed (either the power dips below low power threshold or power increases to or above upper power threshold). At process 716A, responsive to the trigger, the wireless device gathers power information about the wireless device and, at process 718A, provides the power information to a charger.

Referring to FIG. 7B, process 700B illustrates a flow diagram showing an example process 700B facilitating calculation of power consumption of a wireless device in a wireless power delivery environment, according to an embodiment. To begin, a wireless charger receives power information from a wireless device and transfers the information to a cloud processing system. As discussed above, some or all of the processes or steps discussed can alternatively or additionally be performed by a charger in other embodiments.

At process 710B, the cloud processing system receives the information associated with the wireless device. At process 712B, the cloud processing system calculates power usage of the client based on the information. The power usage may be calculated based on a discharge/charge curve for the particular battery in the wireless device, as described above. Next, at a decision process 714B, the cloud processing system determines if a trigger has been detected. In some embodiments, the trigger can be configured to occur periodically. Alternatively or additionally, the trigger can occur if, for example, a threshold level of power is crossed (either the power dips below low power threshold or power increases to or above upper power threshold). If a trigger occurs, at process 716B, the cloud processing system responsively provides power usage information corresponding to the wireless device to an administer and, at process 718B, to the charger. In some examples, the administrator may use the power usage information to detect problems with the charging of wireless devices. For example, if power delivery from a charger to all its associated wireless devices drops over time, the administrator may be able to determine whether something is wrong with that particular charger, or whether something in the charger's environment has changed.

In some embodiments, the process may also branch at process 712B to process 720B where the cloud processing system aggregates data received from multiple devices and, at process 722B, processes the data to identify various trends across geographies, chargers, environments, devices, etc. Once identified, at process 724B, the cloud processing system provides the aggregated data and or the trend data to a data consumer such as, for example, a 3rd party data consumer 510. In some examples, the data consumer may provide use the aggregated data to provide additional services for the administrator or the users of the wireless devices. For example, if the aggregated data indicates that 100% allocation of power delivery cycles can't keep up with the charge needs of the wireless devices, the data consumer may offer a larger or second charger to the administrator of the charger.

Example Computer Systems

Figure 8:
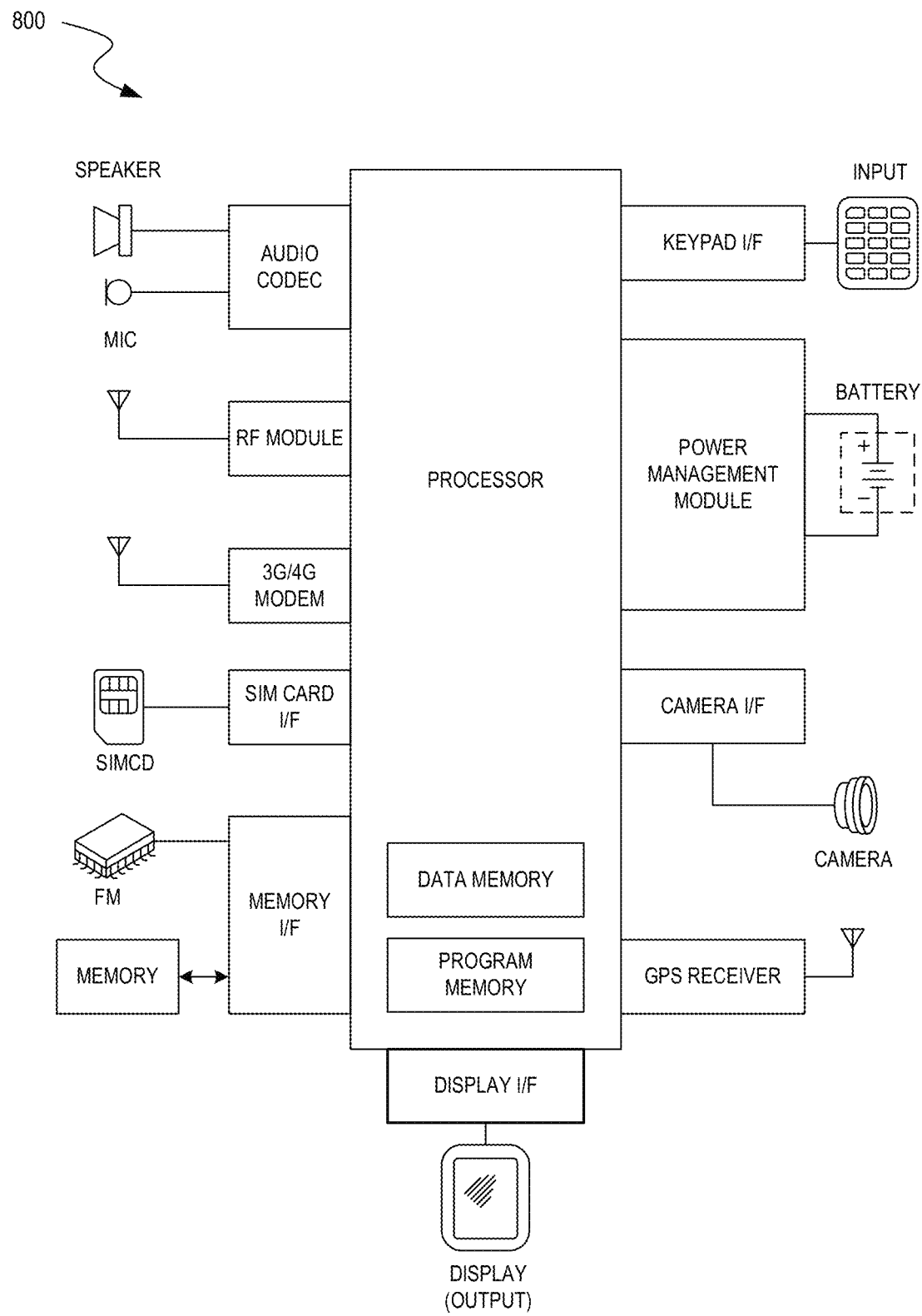
FIG. 8 is a diagrammatic representation of a machine in the example form of a computer system within which a set of instructions, for causing the machine to perform any one or more of the methodologies discussed herein, may be executed.

FIG. 8 depicts a block diagram illustrating example components of a representative client (e.g., mobile device, tablet computer, category controller, maintenance controller, etc.) 800 in the form of a mobile (or smart) phone or tablet computer device. Various interfaces and modules are shown with reference to FIG. 8, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee™ radios and RFID transceivers, along with antennas, can populate the Printed Circuit Board.

Figure 9:
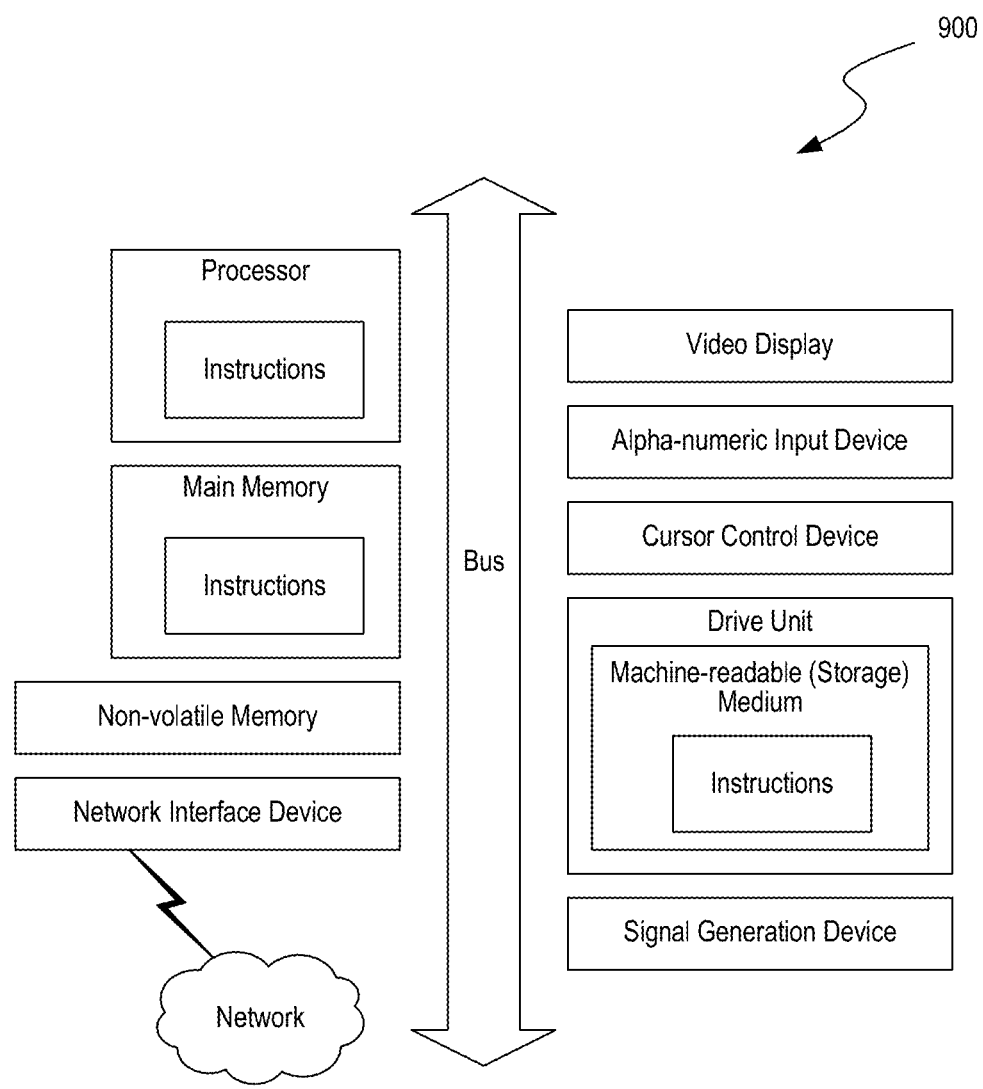
FIG. 9 is a diagrammatic representation of a machine in the example form of a computer system within which a set of instructions, for causing the machine to perform any one or more of the methodologies discussed herein, may be executed.

FIG. 9 depicts a diagrammatic representation of a machine, in the example form, of a computer system 900 within which a set of instructions, for causing the machine to perform any one or more of the methodologies discussed herein, may be executed. The computer system 900 can be representative of any computer system, server, etc., described herein.

In the example of FIG. 9, the computer system 900 includes a processor (CPU), memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel x86-based microprocessor. One of skill in the relevant art will recognize that the terms "machine-readable (storage) medium" or "computer-readable (storage) medium" includes any type of device that is accessible by the processor.

The memory is coupled to the processor by, for example, a bus. The memory can include, by way of example but not limitation, random access memory (RAM), such as dynamic RAM (DRAM), static RAM (SRAM), flash RAM, etc. The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 13. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a liquid crystal display (LCD), OLED, or some other applicable known or convenient display device. For simplicity, it is assumed that controllers of any devices not depicted reside in the interface.

In operation, the computer system 1300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result or output. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description herein. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment).

The machine may be a server computer, a client computer, a personal computer (PC), a tablet PC, a laptop computer, a set-top box (STB), a personal digital assistant (PDA), a cellular telephone, a smart phone a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. An apparatus comprising:
   one or more computer readable storage media having instructions stored thereon which, when executed by one or more processing systems of a wireless power reception device, direct the wireless power reception device to:
   access at least one application program interface (API) associated with an application running on the wireless power reception device to gather power consumption information associated with the application,
      wherein the wireless power reception device is adapted to receive and process coherent wireless power signals, over multiple paths, from a wireless power delivery system in a multipath wireless power delivery environment; and
   direct the wireless power reception device to provide the power consumption information to a power consumption determination system.

2. The apparatus of claim 1, wherein the instructions, when executed by the one or more processing systems, further direct the wireless power reception device to:
   detect a triggering event,
   wherein the power consumption information is provided to the power consumption determination system for determining power consumption responsive to the triggering event.

3. The apparatus of claim 2, wherein the instructions, when executed by the one or more processing systems, further direct the wireless power reception device to:
   monitor a battery level of the wireless power reception apparatus,
   wherein the triggering event is based, at least in part, on the battery level of the wireless power reception device falling below a threshold level.

4. The apparatus of claim 2, wherein the instructions, when executed by the one or more processing systems, further direct the wireless power reception device to:
   identify a rate of power consumption of the wireless power reception device,
   wherein the triggering event is based, at least in part, on the rate of power consumption of the wireless power reception device exceeding a threshold value.

5. The apparatus of claim 2, wherein the power consumption information comprises device-specific information including one or more of:
   device identification information,
   device manufacturer information,
   device model information,
   device operating system information,
   information about applications currently running on the wireless power reception device,
   battery status information,
   battery type information,
   battery model information,
   device location information,
   power received since last request,
   information about coulombs in or out of at least one battery since a last request, or temperature information.

6. The apparatus of claim 2, wherein the instructions, when executed by the processing system, further direct the one or more processing systems to:
   periodically provide the power consumption information to the power consumption determination system.

7. The apparatus of claim 2, wherein the instructions, when executed by the processing system, direct the one or more processing systems to:
   process a communication received from the power consumption determination system; and
   present, via the wireless power reception device, the communication.

8. The apparatus of claim 7, wherein the communication comprises one or more of a visual notification or an audio notification on the wireless power reception device.

9. The apparatus of claim 7, wherein the communication comprises a request for information from the wireless power reception device.

10. The apparatus of claim 1, wherein the power consumption determination system comprises one or more of a wireless power delivery system or a cloud-based processing system.

11. A method of providing power consumption information associated with a wireless power reception device to a power consumption determination system in a wireless power delivery environment, wherein the wireless power reception device is configured to receive wireless power from a wireless power delivery system having a wireless transmitter with multiple antennas, the method comprising:
   accessing application program interfaces (APIs) associated with one or more applications running on the wireless power reception device;
   gathering at least a portion of the power consumption information associated with the wireless power reception device using the APIs; and
   transmitting the power usage information to the power consumption determination system.

12. The method of claim 11, wherein the APIs correspond to applications executing on a processing system of the wireless power reception device.

13. The method of claim 11, wherein the power usage information is transmitted to the power consumption determination system responsive to a triggering event.

14. The method of claim 13, wherein the triggering is based, at least in part, on a battery level of the wireless power reception device falling below a threshold level or a rate of power consumption of the wireless power reception device exceeding a threshold value.

15. The method of claim 13, further comprising:
receiving a request for information from the wireless power reception device, wherein the request comprises the triggering event.

16. The method of claim 11, wherein the power usage information is transmitted to the power consumption determination system periodically.

17. The method of claim 11, wherein the power consumption determination system comprises one or more of a wireless power delivery system or a cloud-based processing system.

18. A wireless power reception device comprising:
one or more antennas; and
control circuitry configured to:
access at least one application program interface (API) associated with one or more applications running on the wireless power reception device to gather power consumption information associated with the wireless power reception device,
wherein the wireless power reception device is adapted to receive wireless power from a wireless power delivery system; and
provide the power consumption information associated with the wireless power reception device to a power consumption determination system.

19. The wireless power reception device of claim 18, wherein the control circuitry is configured to provide the power consumption information periodically or responsive to a triggering event.

20. The wireless power reception device of claim 18, wherein the power consumption determination system comprises one or more of a wireless power delivery system or a cloud-based processing system.

* * * * *